(12) United States Patent
Wilkes (10) Patent No.: US 7,146,569 B2
(45) Date of Patent: Dec. 5, 2006

(54) METHOD, APPARATUS, AND PROGRAM FOR VISUAL REPRESENTATION OF AN ADDRESS SPACE

(75) Inventor: William Francis Wilkes, Centerport, NY (US)

(73) Assignee: International Business Machines Corporation, Armonk, NY (US)

( * ) Notice: Subject to any disclaimer, the term of this patent is extended or adjusted under 35 U.S.C. 154(b) by 843 days.

(21) Appl. No.: 10/268,232

(22) Filed: Oct. 10, 2002

(65) Prior Publication Data

US 2004/0070632 A1    Apr. 15, 2004

(51) Int. Cl.
    *G09G 5/00* (2006.01)
    *G06F 3/00* (2006.01)
(52) U.S. Cl. .................. 715/736; 715/735; 715/734
(58) Field of Classification Search ............. 715/734, 715/735, 736
    See application file for complete search history.

(56) References Cited

U.S. PATENT DOCUMENTS

| | | | | |
|---|---|---|---|---|
| 5,528,735 A * | 6/1996 | Strasnick et al. | ............ | 345/427 |
| 5,550,970 A * | 8/1996 | Cline et al. | ................. | 715/772 |
| 5,751,287 A * | 5/1998 | Hahn et al. | ................. | 715/775 |
| 5,819,092 A   | 10/1998 | Ferguson et al. | ............ | 395/701 |
| 5,945,998 A * | 8/1999 | Eick | ............................ | 345/589 |
| 6,009,103 A * | 12/1999 | Woundy | ..................... | 370/401 |
| 6,128,624 A   | 10/2000 | Papierniak et al. | ......... | 707/104 |
| 6,351,776 B1  | 2/2002 | O'Brien et al. | ............. | 709/245 |
| 6,404,444 B1* | 6/2002 | Johnston et al. | ............ | 715/839 |
| 6,690,400 B1* | 2/2004 | Moayyad et al. | ........... | 715/779 |
| 6,912,578 B1* | 6/2005 | Hanko et al. | ............... | 709/227 |

* cited by examiner

*Primary Examiner*—Kieu D. Vu
(74) *Attorney, Agent, or Firm*—Duke W. Yee; David A. Mims, Jr.; Gerald H. Glanzman (57) ABSTRACT

A mechanism is provided for generating visual representations of an address space. More particularly, the dotted quad notation of an Internet Protocol address space is illustrated. A discovery process is performed to identify addresses of entities in the network, as well as other information, such as device type, operating system, geographic location, and the like. Each unique address is represented by a graphical icon representing a value of the fourth quad of the address. The graphical icons may be three-dimensional and may be indicative of the type of device. These icons are formed into strings of icons, each string of icons representing a value of the third quad of the addresses. The strings of icons are formed into spokes on wheels, each wheel representing a value of the second quad of the addresses. The wheels are stacked into cylinders, each cylinder representing a value of the first quad of the addresses. The cylinders are formed into spokes of another wheel or disk that represents the entire address space. The address space disk may be presented in association with a geographic region. Address space disks may be captured and stored periodically. These address space disks then may be stacked to form cylinders, each cylinder representing a predetermined number of seconds. Alternatively, the time-stamped address space disks may be rotated to form spheres, each sphere representing, for example, sixty seconds.

28 Claims, 11 Drawing Sheets

60 SECONDS

10 SECONDS

5 SECONDS

JANUARY 1, 2002, 6:00 HOUR

FIG. 6C

24 HOURS

METHOD, APPARATUS, AND PROGRAM FOR VISUAL REPRESENTATION OF AN ADDRESS SPACE

BACKGROUND OF THE INVENTION

1. Technical Field

The present invention relates to network data processing systems and, in particular, to the Internet Protocol address space. Still more particularly, the present invention provides a method, apparatus, and program for creating a visual representation of an address space.

2. Description of Related Art

A network is an arrangement of elements that are interconnected by cables, bridges, routers, and switches. A network may also include wireless devices, such as antennas and towers.

A client/server environment is an architecture in which a personal computer or client is a requesting machine and a server supplies access to a resource. Clients are servers may be connected by a local area network (LAN) or wide area network (WAN). A LAN is a communications network that serves users within a confined geographical area and a WAN is a communications network that covers a wide geographic area, such as state or country.

In a client/server environment, the client processes the user interface and can perform some or all of the application processing. Servers range in capacity from high-end personal computers to mainframes. Servers may facilitate access to resources, such as files, printers, or applications. The terms "client" and "server" may refer to both the hardware and software or just the software that performs the request or service. For example, a Web server may refer to the Web server software in a computer that also runs other applications or it may refer to a computer system dedicated only to the Web server application.

The Internet represents a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages.

Entities in a network are located using a unique address. An IP address is the address of a computer attached to a TCP/IP network. Every client and server must have a unique IP address. Client workstations have either a permanent address or one that is dynamically assigned to them each session. IP addresses are 32-bit numbers commonly written as four decimal numbers separated by periods; for example, 192.168.1.101. This is referred to as the "dotted quad notation," each number or "quad" being between zero and 256.

Typically, the entities in a network are visualized using a network topology map. A network topology map illustrates the physical connection of devices in a network, how they are geographically arranged, and how they communicate with one another. A network topology map may include addresses; however, the map relates the physical connections and locations of the devices. A network topology map includes little or no information about the address space other than to simply display an address.

Therefore, it would be advantageous to provide an improved mechanism for visualizing an address space.

SUMMARY OF THE INVENTION

The present invention provides a mechanism for generating visual representations of an address space. More particularly, the dotted quad notation of an Internet Protocol address space is illustrated. A discovery process is performed to identify addresses of entities in the network, as well as other information, such as device type, operating system, geographic location, and the like.

Each unique address is represented by a graphical icon. In other words, each icon represents an address value or a value of the fourth, lowest-order quad of the address. The graphical icons may be three-dimensional and may be indicative of the type of device. These icons are formed into strings of icons, each string of icons representing a value of the third quad of the addresses. The strings of icons are formed into spokes on wheels, each wheel representing a value of the second quad of the addresses. The wheels are stacked into cylinders, each cylinder representing a value of the first, highest-order quad of the addresses. The cylinders are formed into spokes of another wheel or disk that represents the entire address space.

The address space disk may be filtered to display only entities that meet a specified criteria, such as a particular device type or operating system. Furthermore, the address space disk may be presented in association with a geographic region to form a relation between addresses and their corresponding locations.

Address space disks may be captured and stored periodically. For example, an address space disk may be time stamped and stored every second. These address space disks then may be stacked to form cylinders, each cylinder representing a predetermined number of seconds, such as sixty seconds. Then, these cylinders may be formed into spokes on a wheel, each wheel representing a predetermined number of minutes, and so forth.

Alternatively, the time-stamped address space disks may be rotated to form spheres, each sphere representing, for example, sixty seconds. Then, these spheres may be formed into a string, each string representing, for example, sixty minutes. The strings may be formed into spokes on a wheel, each wheel representing, for example, one day.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
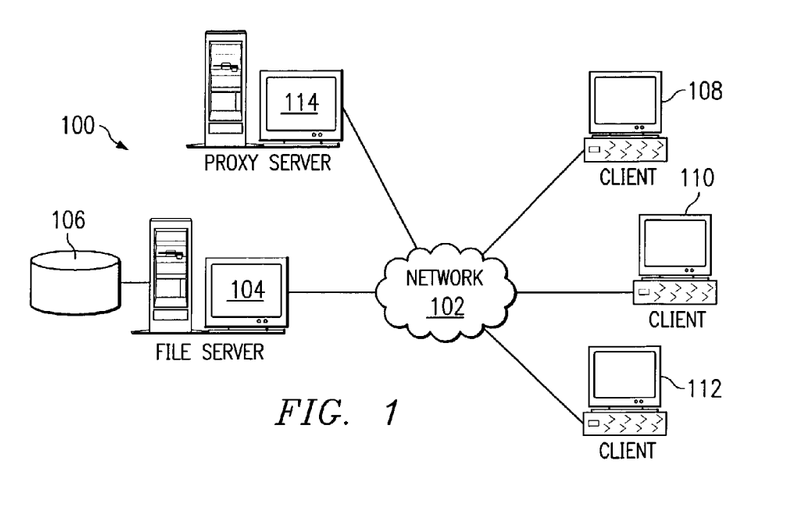
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, servers 104, 114 are connected to network 102. Server 104 provides access to storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

In accordance with a preferred embodiment of the present invention, a mechanism is provided for generating visual representations of an address space for a network, such as network data processing system 100. More particularly, the dotted quad notation of an Internet Protocol address space is illustrated. A discovery process is performed to identify addresses of entities in the network, as well as other information, such as device type, operating system, geographic location, and the like.

Discovery processes, generally, are known in the art and are not the focus of the present invention. However, the use of the discovery information, obtained through a discovery process, to generate a visual representation of an address space is the focus of the present invention. The discovery information may be stored in a data structure, such as a relational database. This data structure may be stored on the network itself. For example, server 104 may perform the discovery process and store the discovery information in storage unit 106.

FIGS. 2A–2E are example visual representations of an address space that may be generated in accordance with a preferred embodiment of the present invention. Each unique address is represented by a graphical representation, such as an icon. In other words, each icon may represent an address value or a value of the fourth, lowest-order quad of the address. The graphical icons may be three-dimensional and may be indicative of the type of device. For example, a client workstation may be represented by a different icon than a server or a printer. Other information may also be depicted in the icon. For example, an icon may indicate whether a printer needs service, whether a server is operating at or near maximum capacity, or whether a firewall detects an attack from an outside device.

Figure 2A:
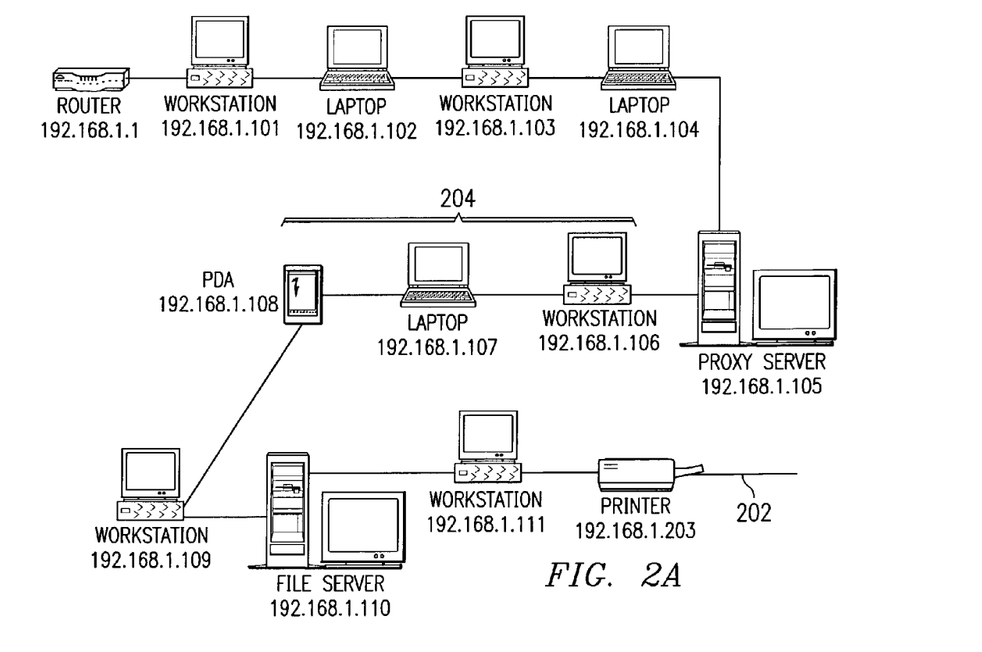
FIGS. 2A–2E are example visual representations of an address space that may be generated in accordance with a preferred embodiment of the present invention.

These icons are then formed into strings of icons, each string of icons representing a value of the third quad of the addresses. FIG. 2A illustrates an example visual representation of a string of icons for an address space in accordance with a preferred embodiment of the present invention. Icons, such as icons 204, are connected together along string 202. Icons 204 represent the address values 192.168.1.106, 192.168.1.107, and 192,168,1.108. String 202 represents addresses 192.168.1.Z, where "Z" is all values in the fourth quad. In the example shown in FIG. 2A, the string is curved into an "S" shape. However, the string may form other shapes, such as a straight line.

Figure 2B:
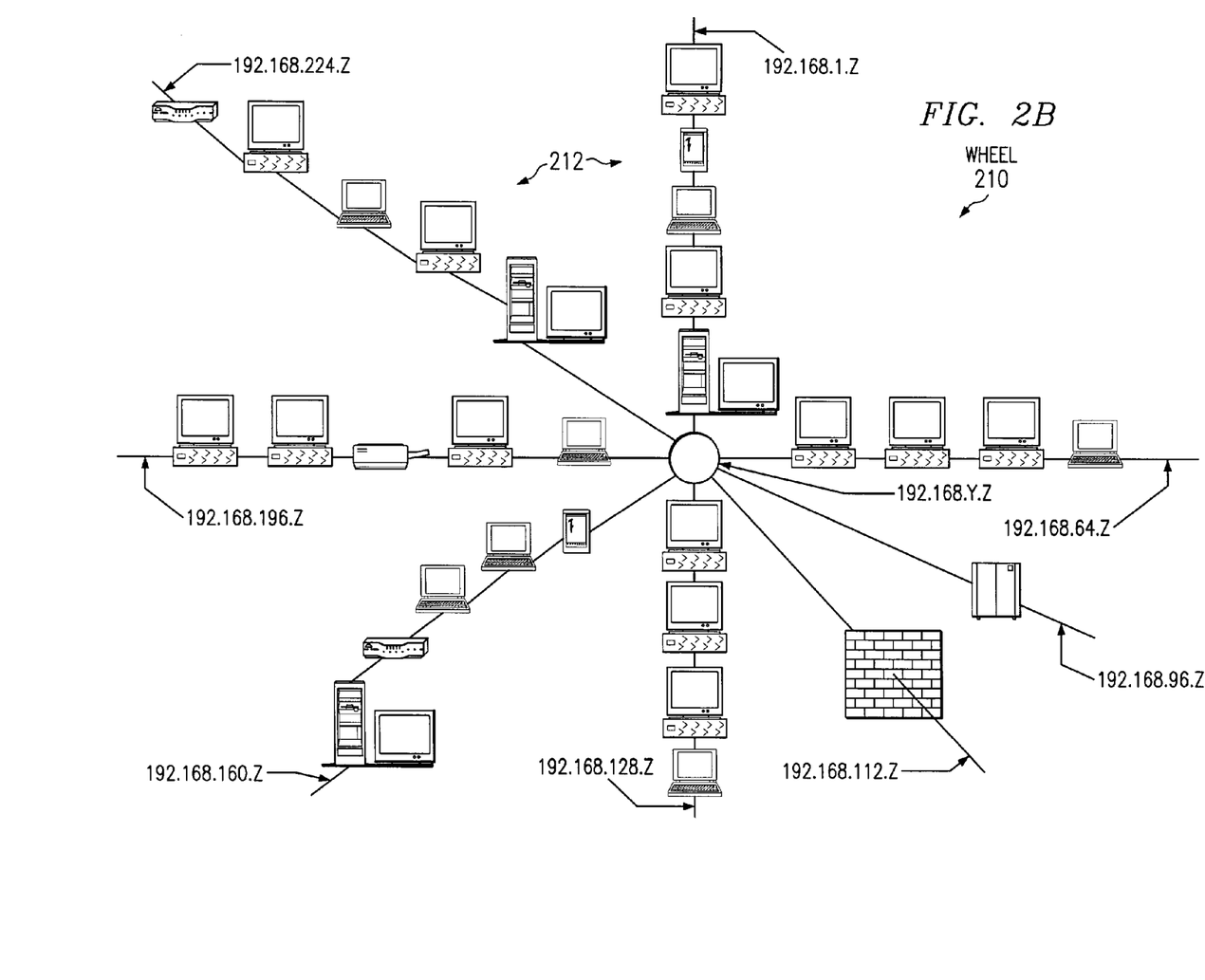

The strings of icons are formed into spokes on wheels, each wheel representing a value of the second quad of the addresses. FIG. 2B illustrates an example visual representation of strings forming spokes on a wheel in accordance with a preferred embodiment of the present invention. Spokes, such as strings 212, are formed into wheel 210. Specifically, strings 212 represent the address values 192.168.1.Z and 192.168.224.Z. Wheel 210 represents the address values 192.168.Y.Z, where "Y" is all the values in the third quad. The wheel of FIG. 2B may be presented on a visual display. A graphical user interface may be provided to allow the user to navigate the visual representation. The wheel may also be printed to illustrate a value of the second quad of the address space.

Figure 2C:
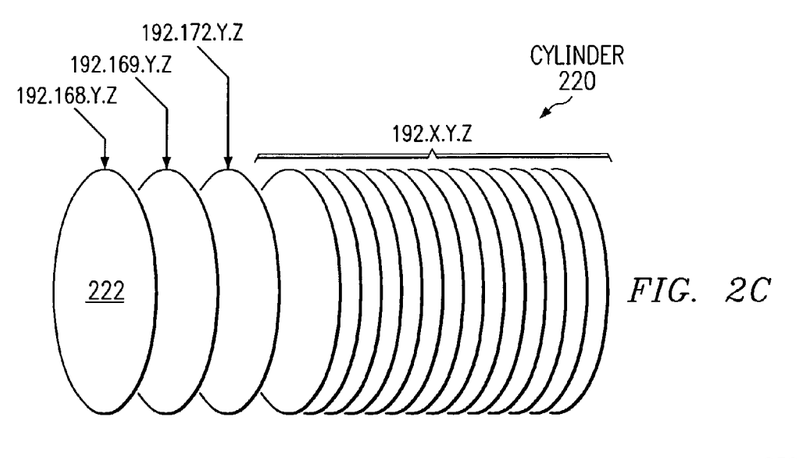

The wheels are stacked into cylinders, each cylinder representing a value of the first, highest-order quad of the addresses. FIG. 2C illustrates an example visual representation of a stack of wheels forming a cylinder in accordance with a preferred embodiment of the present invention. The wheels, such as wheel 222, are stacked into cylinder 220. Specifically, wheel 222 represents the addresses 192.168.Y.Z. Cylinder 220 represents the addresses 192.X.Y.Z, where X is all values of the second quad.

Cylinder 220 may be rendered so that the details of each wheel are visible. If the visual representation is presented on a display device, a graphical user interface may be provided to allow a user to zoom in to a particular wheel, rotate the cylinder around one or more axes, or move the cylinder to center on various points. A graphical user interface may also allow a user to select a wheel from the cylinder for display. The visual representation may also be printed for illustration of a value of the first quad of the address space.

Figure 2D:
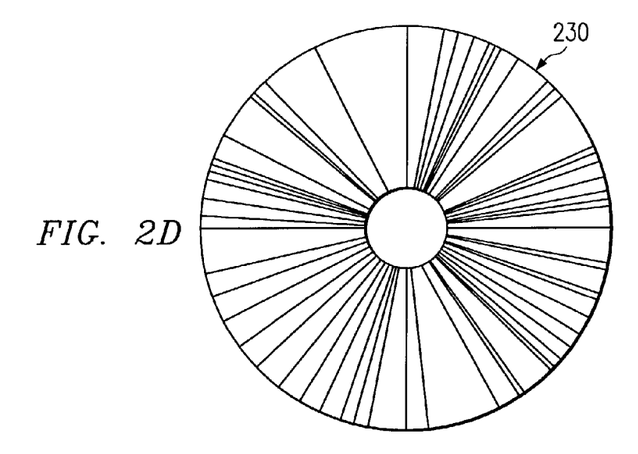

The cylinders are formed into spokes of another wheel or disk that represents the entire address space. FIG. 2D illustrates an example visual representation of an address space disk in accordance with a preferred embodiment of the present invention. Cylinders, such as cylinder 220 in FIG. 2C, form spokes on disk 230, which represents the entire address space.

Disk 230 may be rendered so that the details of each cylinder, each wheel on each cylinder, each spoke on each wheel, and each icon on each spoke are visible. If the visual representation is presented on a display device, a graphical user interface may be provided to allow a user to zoom in to a particular cylinder, zoom in to a particular wheel, rotate a cylinder around one or more axes, or move the display to center on various points. A graphical user interface may also allow a user to select a cylinder from the disk for display. The visual representation may also be printed for a detailed illustration of the address space. Furthermore, the visual representation may be constructed into a three-dimensional model.

The dotted quad notation is referred to as "IP4 address space." The above described visual representation of the IP4 address space is easily extended to other address spaces. For example, in the IP6 address space, an address may be written as six decimal numbers separated by periods, each number or "quad" being between zero and 256. When migrating to IP6, address space disks may be stacked to make cylinders and the cylinders may form another disk representing the entire IP6 address space.

Figure 2E:
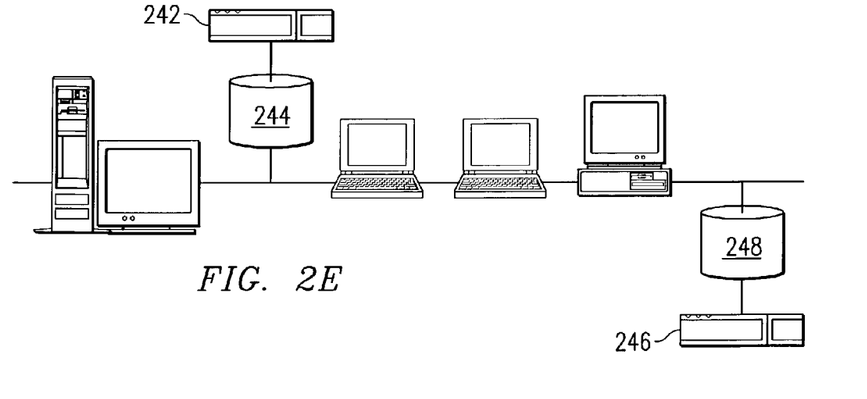

FIG. 2E is a illustrates an example visual representation of a string of icons for an address space with a visual representation of bandwidth in accordance with a preferred embodiment of the present invention. Icons are connected together along a string. Icons 242, 246 represent, for example, routers that have a bandwidth associated therewith. Icons 242, 246 are connected to the string by a pipelines 244, 248, which are visual representations of the bandwidth of the routers. For example, pipeline 244 may represent that router 242 has a bandwidth of 10 Mbps. On the other hand, the thicker pipeline 248 may represent that router 246 has a bandwidth of 100 Mbps.

Figure 3:
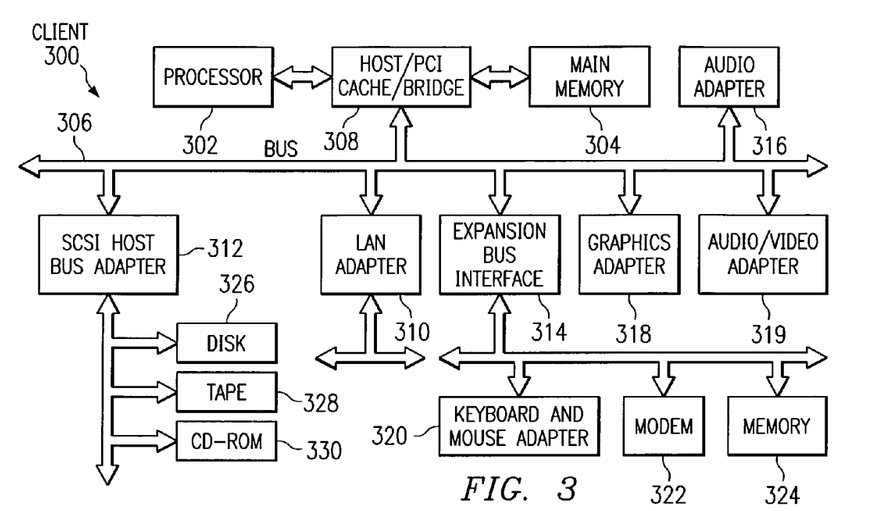
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCT bridge 308 also may include an integrated memory controller and cache memory for processor 302. Additional connections to PCI local bus 306 may be made through direct component interconnection or through add-in boards.

In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide nonvolatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4A:
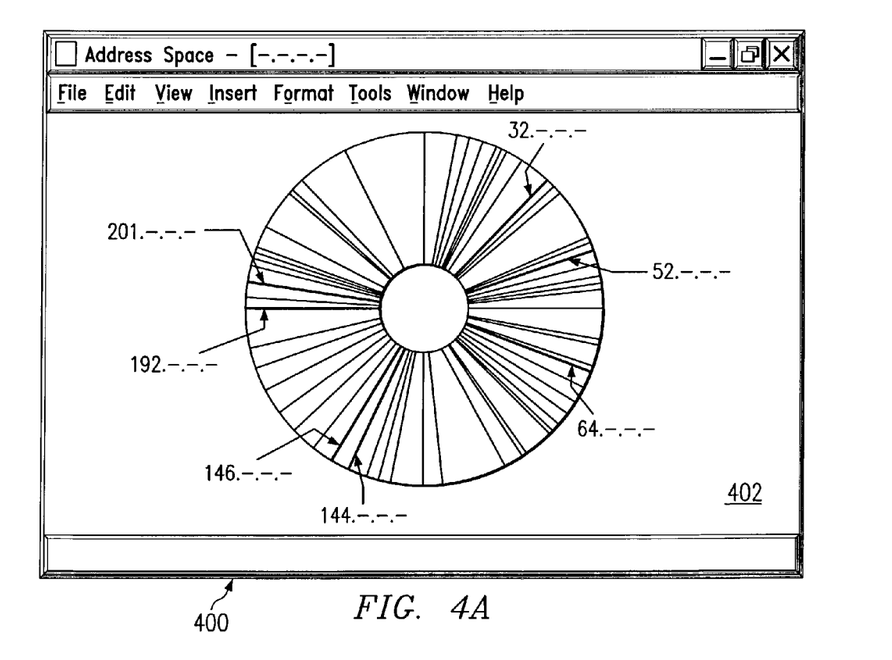
FIGS. 4A–4D depict example screens of display illustrating visual representations of an address space in accordance with a preferred embodiment of the present invention.

FIGS. 4A–4D depict example screens of display illustrating visual representations of an address space in accordance with a preferred embodiment of the present invention. FIG. 4A illustrates window 400 displaying address space disk 402, which represents an entire IP address space. More particularly, FIG. 4A may represent a subset of the IP address space, such as the addresses used by a particular enterprise or the address space filtered by a given criteria. In the depicted example, address space disk 402 may depict the addresses used by an enterprise and particular addresses meeting a given criteria. For example, the following addresses are highlighted: 32.--.--.--, 52.--.--.--, 64.--.--.--, 144.--.--.--, 146.--.--.--, 192.--.--.--, and 201.--.--.--. These addresses may include nodes that are running a specified operating system.

Window 400 may include an interface that allows a user to manipulate the disk to zoom in or out, rotate the disk, or move the disk. More simply, window 400 may include an interface that allows a user to select a cylinder that forms one of the spokes. For example, the user may select a cylinder by placing a mouse cursor over a spoke and selecting the spoke with a mouse click. Alternatively, the user may enter a value for the first quad in a text field.

Figure 4B:
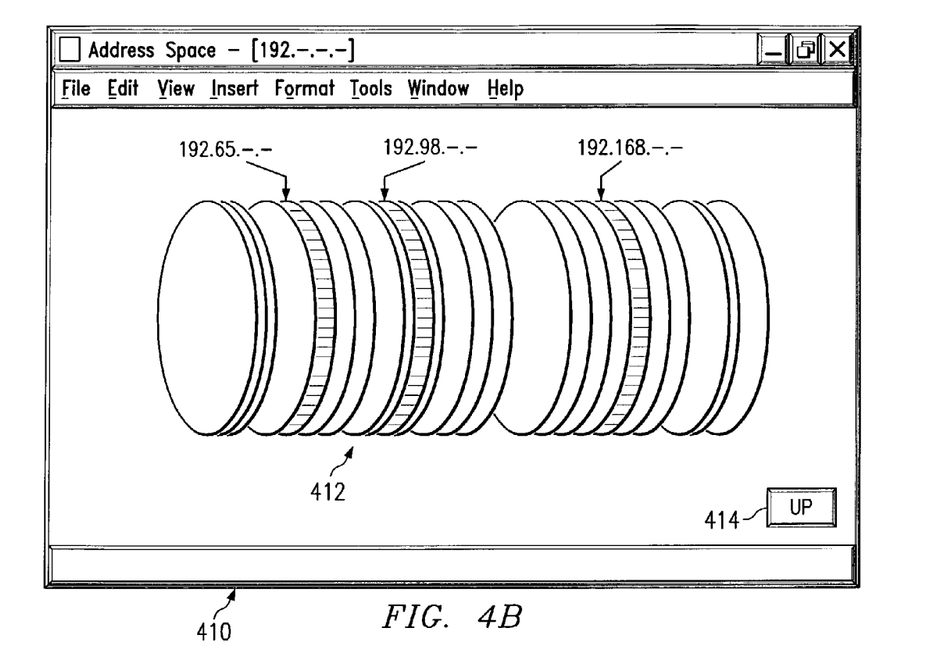

Turning next to FIG. 4B, window 410 illustrates example cylinder 412, which represents a value of the first quad in the address space. In the depicted example, address space cylinder 412 may depict the addresses used by an enterprise and particular addresses meeting a given criteria. For example, the following addresses are highlighted: 192.65.--.--, 192.98.--.--, and 192.168.--.--. These addresses may include nodes that are running the specified operating system.

Window 410 may include an interface that allows a user to manipulate the cylinder to zoom in or out, rotate the cylinder, or move the cylinder. More simply, window 410 may include an interface that allows a user to select a wheel from the cylinder. For example, the user may select a wheel by placing a mouse cursor over a wheel and selecting the wheel with a mouse click. Alternatively, the user may enter a value for the second quad in a text field. Window 410 also includes "UP" button 414, which allows a user to navigate to the address space disk level.

Figure 4C:
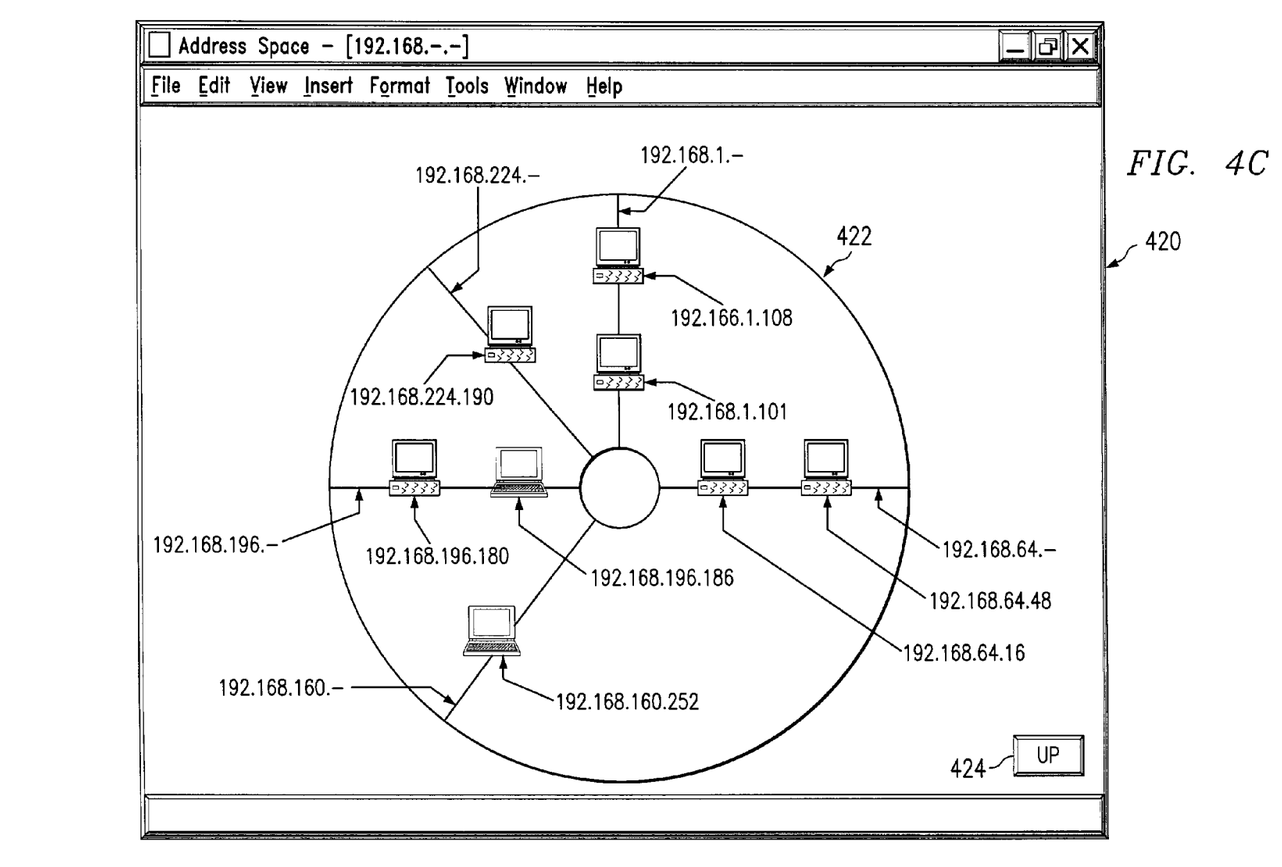

FIG. 4C illustrates window 420 displaying address space wheel 422, which represents a value of the second quad in the address space. In the depicted example, address space wheel 422 may depict the addresses used by an enterprise and particular addresses meeting a given criteria. These addresses may include entities that, for example, are running a specified operating system.

Window 420 may include an interface that allows a user to manipulate the wheel to zoom in or out, rotate the wheel, or move the wheel. More simply, window 420 may include an interface that allows a user to select an entity on the wheel. For example, the user may select an entity by placing a mouse cursor over an icon and selecting the icon with a mouse click. Alternatively, the user may enter an address value in a text field. Window 420 also includes "UP" button 424, which allows a user to navigate to the address space cylinder level.

Each icon may be associated with an entry in a database. Thus, when a user selects an icon representing a distinct IP address, a table may be displayed that contains all the desired information about that IP address. For example, the table may display the entity type (e.g. server, router, switch, firewall, etc.), the operating system, installed applications, physical location (e.g. longitude and latitude), and so forth. This information may include all information discovered by a discovery process or only a specified subset of information.

Figure 4D:
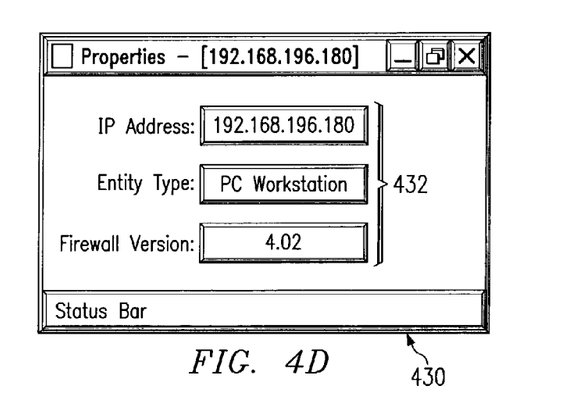

FIG. 4D illustrates an example window 430 displaying properties for a selected entity. Window 430 includes a property display area 432 in which desired properties are shown. In the example shown in FIG. 4D, the IP Address, Entity Type, and Firewall Version are shown. However, any properties that are known or can be discovered in the network may be shown in window 430. The properties may be selectable or may vary depending on the discovery process used. This information may be used, for example, to identify an entity to be updated, to identify a user of an entity, to determine a cause of a failure, etc.

As an example, if a printer may receive a large print job that causes problems for workers, an administrator may identify a printer as highlighted in the visual representation of the address space. The administrator may then use the properties of the printer to identify the print job and trace the print job to an originating IP address. The administrator may then navigate the address space to that IP address and observe the properties and identify a user.

Figure 5:
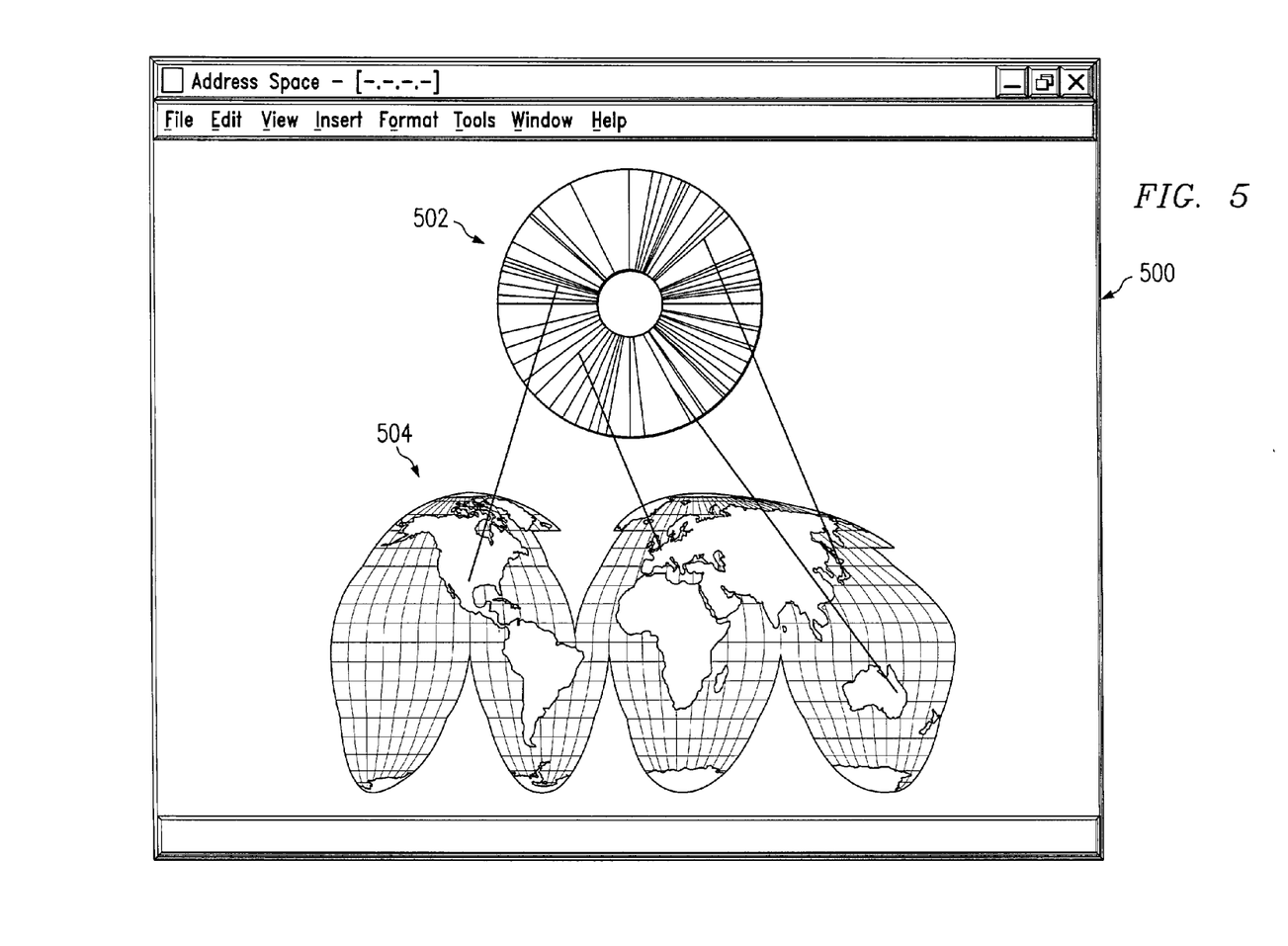
FIG. 5 depicts an example screen of display illustrating a visual representation of an address space in relation to a geographic area in accordance with a preferred embodiment of the present invention.

FIG. 5 depicts an example screen of display illustrating a visual representation of an address space in relation to a geographic area in accordance with a preferred embodiment of the present invention. Window 500 displays address space disk 502, which represents an entire IP address space. More particularly, address space disk 502 may represent a subset of the IP address space, such as the addresses used by a particular enterprise or the address space filtered by a given criteria.

In the depicted example, four distinct addresses are shown with a beam projecting onto map 504, which represents a geographic area. These addresses may include, for example, addresses from which attacks are being detected. Using the address space disk in relation to the representation of a geographic area, a user may easily make a visual association between an address of an entity and the location of the entity. The user may also select the address space disk to navigate through the address space.

Figure 6A:
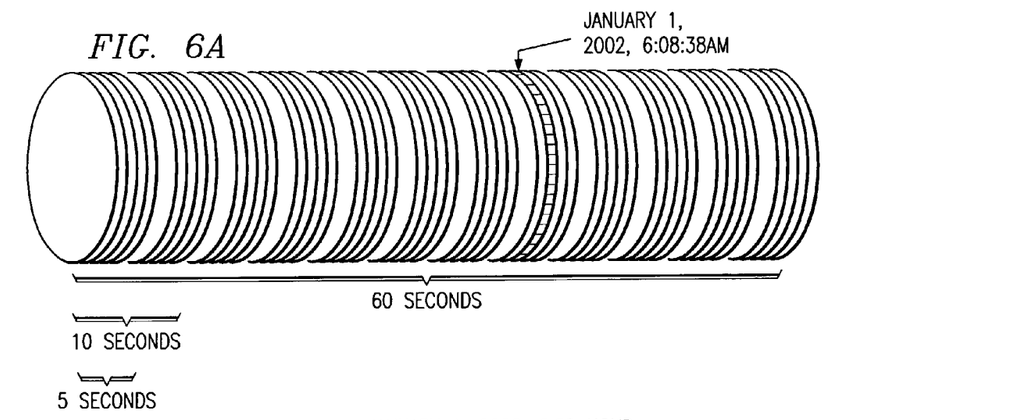
FIGS. 6A–6D are example chronological visual representations of an address space that may be generated in accordance with a preferred embodiment of the present invention.

FIGS. 6A–6D are example chronological visual representations of an address space that may be generated in accordance with a preferred embodiment of the present invention. As time passes, address space disks may be captured and stacked to form a cylinder. For example, an address space disk may be captured every second. FIG. 6A depicts an example cylinder of sixty address space disks, each disk representing the address space at a particular second of time. Thus, it follows that the cylinder represents a minute of time.

Figure 6B:
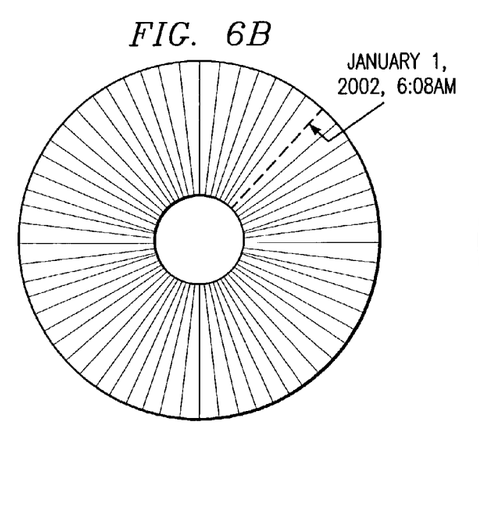
Figure 6C:
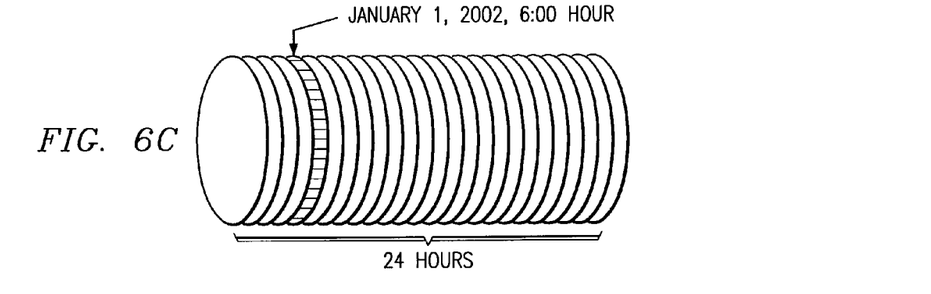
Figure 6D:
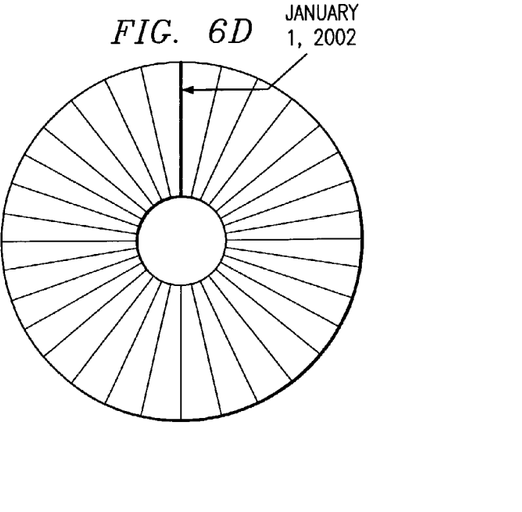

The cylinders are formed into spokes of another wheel or disk that represents a longer period of time. FIG. 6B illustrates an example visual representation of sixty cylinders forming a wheel, which represents an hour of time. In turn, twenty-four wheels may be formed into a cylinder that represents a day, as shown in FIG. 6C. Then, the one-day cylinders may form spokes on a wheel or disk to represent a week, month, or year. With reference to FIG. 6D, an example wheel representing a month is shown.

The visual representations may be highlighted to indicate a significant time. For example, in FIG. 6A, the time Jan. 1, 2002, 6:08:38 AM may be highlighted. The highlighted disk may mark, for example, the time at which a device failed or a malicious attack occurred. In FIG. 6B, the cylinder representing a particular minute is highlighted. Similarly, in FIG. 6C, the appropriate hour is highlighted, and in FIG. 6D, the appropriate day is highlighted. Using these visual representations, a user may identify patterns or simply make visual associations with respect to time. Then, using a graphical user interface, a user may navigate through the layers to a particular level of detail.

Figure 7A:
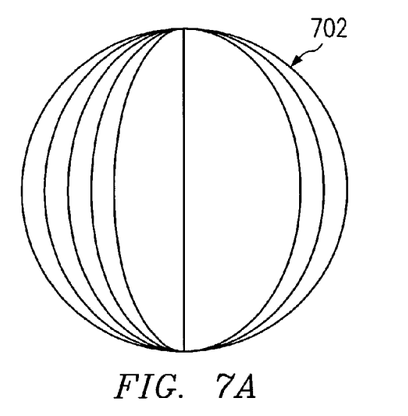
FIGS. 7A–7C are alternative example visual representations of an address space in accordance with a preferred embodiment of the present invention.
Figure 7B:
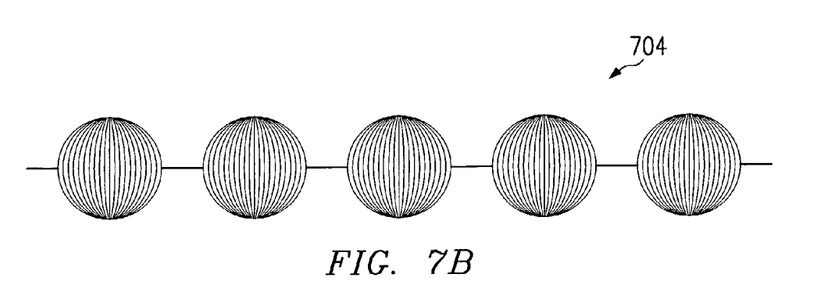
Figure 7C:
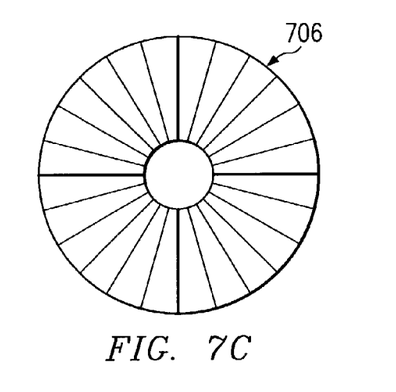

FIGS. 7A–7C are alternative example visual representations of an address space in accordance with a preferred embodiment of the present invention. More particularly, with respect to FIG. 7A, address space disks may be rotated about an axis periodically to form a sphere of address space disks. For example, sixty address space disks captured every second may form a sphere, where each sphere represents a minute.

Turning to FIG. 7B, the one-minute spheres may be connected together into a string of sixty spheres, where each string represents an hour. The strings may then be formed into spokes on a wheel. FIG. 7C illustrates a wheel of twenty-four spokes, where the wheel represents a day.

The visual representations, such as the examples in FIGS. 2A–2D, FIGS. 6A–6D, and FIGS. 7A–7C, may be generated and rendered on a display for manipulation or navigation or to obtain information about the entities. Alternatively, the visual representations may be printed into hard copy form. This printed form may be produced by computer printing, by hand drafting, or by any other suitable printing technique.

Figure 8:
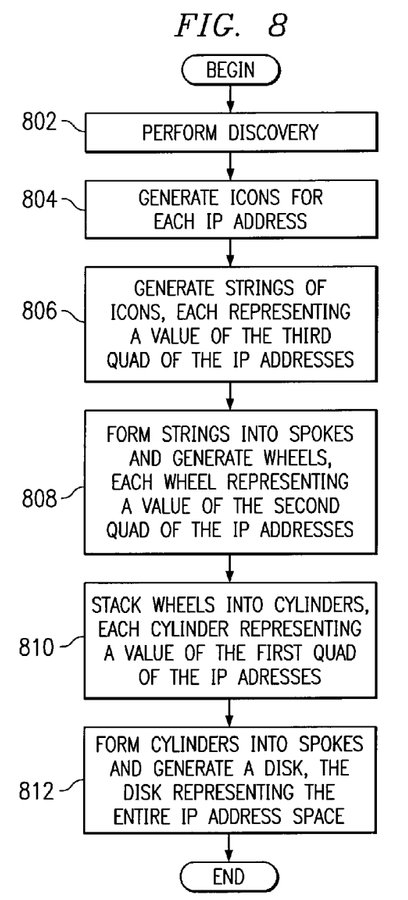
FIG. 8 is a flowchart illustrating the operation of a process for generating a visual representation of an address space in accordance with a preferred embodiment of the present invention.

With reference now to FIG. 8, a flowchart illustrating the operation of a process for generating a visual representation of an address space is shown in accordance with a preferred embodiment of the present invention. The process begins and performs discovery (step 802). The process generates icons for each IP address (step 804). Then, the process generates strings of icons, each representing a value of the third quad of the IP addresses (step 806).

Thereafter, the process forms the strings into spokes and generates wheels, each wheel representing a value of the second quad of the IP addresses (step 808). The process then stacks the wheels into cylinders, each cylinder representing a value of the first quad of the IP addresses (step 810). Next, the process forms the cylinders into spokes and generates a disk that represents the entire IP address space (step 812). Then, the process ends.

Figure 9:
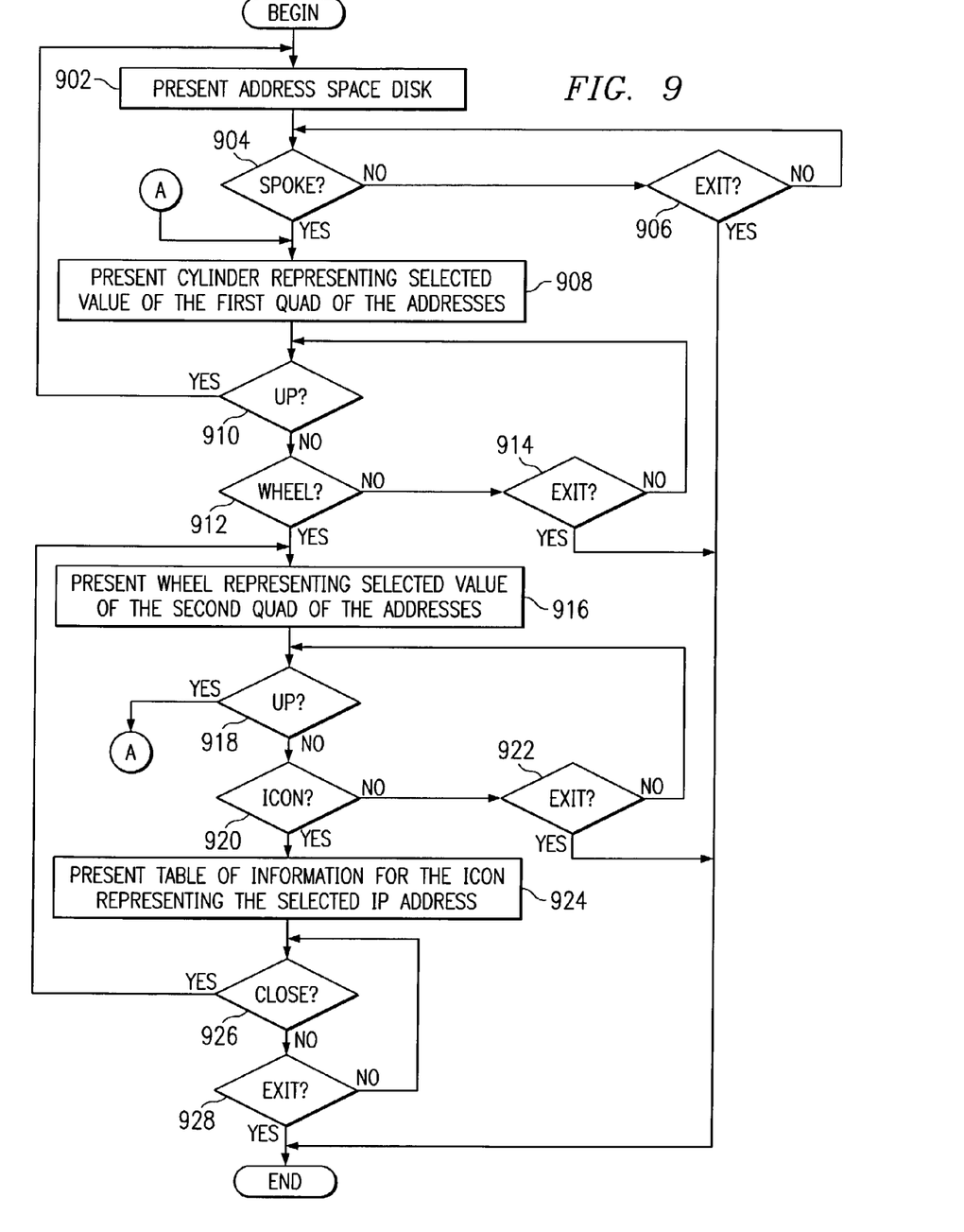
FIG. 9 is a flowchart for navigating a visual representation of an address space in accordance with a preferred embodiment of the present invention.

With reference to FIG. 9, a flowchart for navigating a visual representation of an address space is shown in accordance with a preferred embodiment of the present invention. The process begins and presents an address space disk (step 902). Then, a determination is made as to whether a spoke on the disk is selected (step 904). If a spoke on the disk is not selected, a determination is made as to whether an exit condition exists (step 906). An exit condition may exist, for example, when the user closes the window or otherwise exits the program. If an exit condition exists, the process ends; otherwise, the process returns to step 904 to determine whether spoke on the address space disk is selected.

If a spoke on the address space disk is selected in step 904, the process presents the cylinder representing the selected value of the first quad of the addresses (step 908). Then, a determination is made as to whether the user selects to go up a level in the visual representation (step 910). If the user selects to go up a level, the process returns to step 902 to present the address space disk. If the user does not select to go up a level in the visual representation in step 910, a determination is made as to whether a wheel in the cylinder is selected (step 912). If a wheel is not selected, a determination is made as to whether an exit condition exists (step 914). If an exit condition exists, the process ends; otherwise, the process returns to step 910 to determine whether the user selects to go up a level in the visual representation.

If a wheel in the cylinder is selected in step 912, the process presents the wheel representing the selected value of the second quad of the addresses (step 916). Then, a determination is made as to whether the user selects to go up a level in the visual representation (step 918). If the user selects to go up a level, the process returns to step 908 to present the cylinder representing the selected value of the first quad. If the user does not select to go up a level in the visual representation in step 918, a determination is made as to whether an icon is selected (step 920). If an icon is not selected, a determination is made as to whether an exit condition exists (step 922). If an exit condition exists, the process ends; otherwise, the process returns to step 918 to determine whether the user selects to go up a level in the visual representation.

If an icon is selected in step 920, the process presents a table of discovery information for the icon representing the selected IP address (step 924). The table may presented, for example, in a pop-up window. Then, a determination is made as to whether the user selects to close the table window (step 926). If the user selects to close the table window, the process returns to step 916 to present the wheel representing the selected value of the second quad of the addresses. If the user does not select to close the table window in step 926, a determination is made as to whether an exit condition exists (step 928). If an exit condition exists, the process ends; otherwise, the process returns to step 926 to determine whether the user selects to close the table window.

Figure 10A:
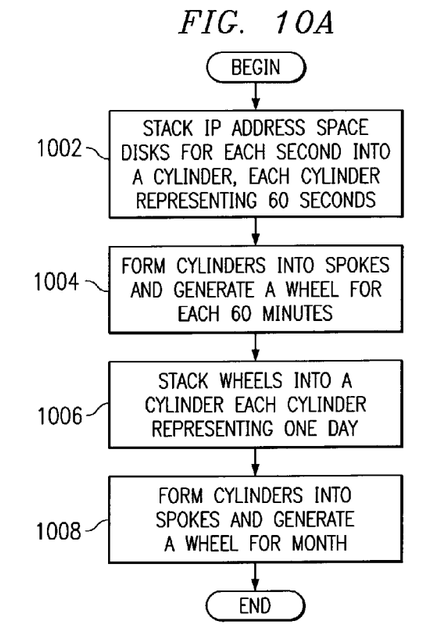
FIGS. 10A and 10B are flowcharts illustrating the operation of a process for generating a chronological visual representation of an address space in accordance with a preferred embodiment of the present invention.
Figure 10B:
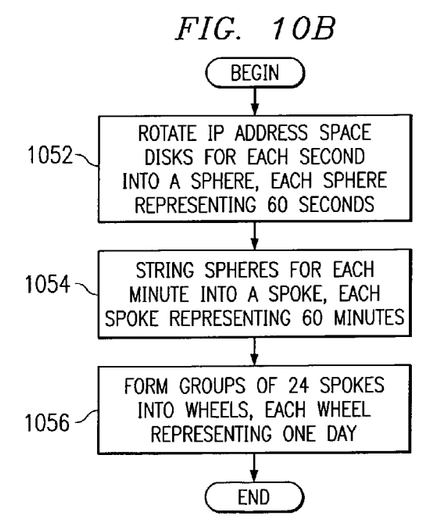

With reference to FIGS. 10A and 10B, flowcharts illustrating the operation of a process for generating a chronological visual representation of an address space are shown in accordance with a preferred embodiment of the present invention. More particularly, with reference to FIG. 10A, the process begins and stacks IP address space disks for each second into a cylinder, each cylinder representing sixty seconds (step 1002). Then, the process forms the cylinders into spokes and generates a wheel, each wheel representing sixty minutes (step 1004). Next, the process stacks the wheels into a cylinder, each cylinder representing one day (step 1006). The process then forms the cylinders into spokes and generates a disk that represents a month (step 1008). Thereafter, the process ends.

Turning now to FIG. 10B, an alternative process is shown. The process begins and rotates IP address space disks for each second into a sphere, each sphere representing sixty seconds (step 1052). Then, the process strings the spheres into a spoke, each spoke representing sixty minutes (step 1054). Next, the process forms groups of twenty-four spokes into wheels, each wheel representing one day (step 1056). Thereafter, the process ends.

Thus, the present invention solves the disadvantages of the prior art by providing a visual representation of an address space topology. The address space visualization provides a view of a network or the entire Internet that renders related information easy to understand and observe. The visual representations may be used for any subset of IP addresses or every known address in the Internet. An address space disk may be associated with a geographic area. Address space disks may also be captured and compiled into a chronological representation.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for providing a visual representation of an address space, comprising:
   providing a first visual representation of a first type, wherein the first visual representation represents a first subset of addresses within the address space; and
   providing a second visual representation of a second type, wherein the second visual representation represents a plurality of subsets of addresses within the address space, wherein the plurality of subsets includes the first subset, and wherein the second visual representation is made up of a plurality of visual representations of the first type;
   wherein the second visual representation represents the address space; and
   wherein the second visual representation comprises an address space disk having spokes and wherein each spoke in the address space disk comprises a cylinder representing a value of a first quad in a dotted quad notation.

2. The method of claim 1, wherein each address in the address space is represented in the dotted quad notation.

3. The method of claim 2, wherein the first visual representation represents a value of one of a first quad in the dotted quad notation, a second quad in the dotted quad notation, a third quad in the dotted quad notation, and a fourth quad in the dotted quad notation.

4. The method of claim 3, wherein the first type is one of a graphical icon, a three-dimensional graphical icon, a string of icons, a wheel, and a cylinder.

5. The method of claim 2, wherein the second visual representation represents one of a first quad in the dotted quad notation, a second quad in the dotted quad notation, and a third quad in the dotted quad notation.

6. The method of claim 5, wherein the second visual representation comprises a string of icons, a wheel, a cylinder, and an address space disk.

7. The method of claim 1, further comprising:
presenting the address space disk in association with a geographic map, wherein the address space disk includes a first address value having a geographic location associated therewith; and
graphically connecting the first address value on the address space disk with the geographic location on the geographic map.

8. The method of claim 1, further comprising:
providing a third visual representation of a third type, wherein the third visual representation represents the address space over a first period of time, wherein the third visual representation is made up of a plurality of address space disks, and wherein each address space disk in the plurality of address space disks represents the address space at a given point in time.

9. The method of claim 8, wherein the third visual representation comprises one of a stack of address space disks, wherein the stack of address space disks forms a time cylinder, and a time sphere, wherein the time sphere is made up of a plurality of address space disks rotated about an axis.

10. The method of claim 8, further comprising:
providing a fourth visual representation of a fourth type, wherein the fourth visual representation represents the address space over a second period of time, wherein the fourth visual representation is made up of a plurality of visual representations of the third type, and wherein the plurality of visual representations of the third type includes the third visual representation.

11. The method of claim 1, further comprising:
presenting the second visual representation.

12. The method of claim 11, wherein the step of presenting the second visual representation comprises one of displaying the second visual representation on a display, printing the second visual representation in hard copy form, and constructing the second visual representation as a three-dimensional model.

13. The method of claim 11, further comprising:
receiving from a user a selection of a selected visual representation of the first type; and
presenting the selected visual representation to the user.

14. The method of claim 11, further comprising:
receiving from a user a selection of a selected address value within the second visual representation; and
presenting entity information for an entity having the selected address value.

15. An apparatus for providing a visual representation of an address space, comprising:
means for providing a first visual representation of a first type, wherein the first visual representation represents a first subset of addresses within the address space; and
means for providing a second visual representation of a second type, wherein the second visual representation represents a plurality of subsets of addresses within the address space, wherein the plurality of subsets includes the first subset, and wherein the second visual representation is made up of a plurality of visual representations of the first type;
wherein the second visual representation represents the address space; and
wherein the second visual representation comprises an address space disk having spokes and wherein each spoke in the address space disk comprises a cylinder representing a value of a first quad in a dotted quad notation.

16. The apparatus of claim 15, wherein each address in the address the space is represented in the dotted quad notation.

17. The apparatus of claim 16, wherein the first visual representation represents a value of one of a first quad in the dotted quad notation, a second quad in the dotted quad notation, a third quad in the dotted quad notation, and a fourth quad in the dotted quad notation.

18. The apparatus of claim 17, wherein the first type is one of a graphical icon, a three-dimensional graphical icon, a string of icons, a wheel, and a cylinder.

19. The apparatus of claim 16, wherein the second visual representation represents one of a first quad in the dotted quad notation, a second quad in the dotted quad notation, and a third quad in the dotted quad notation.

20. The apparatus of claim 19, wherein the second visual representation comprises a string of icons, a wheel, a cylinder, and an address space disk.

21. The apparatus of claim 15, further comprising:
means for presenting the address space disk in association with a geographic map, wherein the address space disk includes a first address value having a geographic location associated therewith; and
means for graphically connecting the first address value on the address space disk with the geographic location on the geographic map.

22. The apparatus of claim 15, further comprising:
means for providing a third visual representation of a third type, wherein the third visual representation represents the address space over a first period of time, wherein the third visual representation is made up of a plurality of address space disks, and wherein each address space disk in the plurality of address space disks represents the address space at a given point in time.

23. The apparatus of claim 22, wherein the third visual representation comprises one of a stack of address space disks, wherein the stack of address space disks forms a time cylinder, and a time sphere, wherein the time sphere is made up of a plurality of address space disks rotated about an axis.

24. The apparatus of claim 15, further comprising:
means for presenting the second visual representation.

25. The apparatus of claim 24, wherein the means for presenting the second visual representation comprises one of means for displaying the second visual representation on a display, means for printing the second visual representation in hard copy form, and means for constructing the second visual representation as a three-dimensional model.

26. The apparatus of claim 24, further comprising:
- means for receiving from a user a selection of a selected visual representation of the first type; and
- means for presenting the selected visual representation to the user.

27. The apparatus of claim 24, further comprising:
- means for receiving from a user a selection of a selected address value within the second visual representation; and
- means for presenting entity information for an entity having the selected address value.

28. A computer program product, in a computer recordable medium, for providing a visual representation of an address space, comprising:
- instructions for providing a first visual representation of a first type, wherein the first visual representation represents a first subset of addresses within the address space; and
- instructions for providing a second visual representation of a second type, wherein the second visual representation represents a plurality of subsets of addresses within the address space, wherein the plurality of subsets includes the first subset, and wherein the second visual representation is made up of a plurality of visual representations of the first type;
- wherein the second visual representation represents the address space; and
- wherein the second visual representation comprises an address space disc having spokes and wherein each spoke in the address space disk comprises a cylinder representing a value of a first quad in the dotted quad notation.

* * * * *